(12) United States Patent
McGuire

(10) Patent No.: US 8,244,832 B1
(45) Date of Patent: Aug. 14, 2012

(54) PROVIDING LOCATION INFORMATION TO WEBSITE PROVIDERS

(75) Inventor: Russell Spaid McGuire, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1067 days.

(21) Appl. No.: 11/445,007

(22) Filed: Jun. 1, 2006

(51) Int. Cl.
*G06F 15/16* (2006.01)

(52) U.S. Cl. ........ 709/218; 709/223; 709/233; 709/217; 709/245; 715/207; 715/205; 715/248; 455/456.1; 455/414.1; 455/12.1

(58) Field of Classification Search .................. 709/217, 709/218, 219, 203, 223, 224; 455/414.1, 455/456.1
See application file for complete search history.

(56) References Cited

U.S. PATENT DOCUMENTS

| 6,912,545 | B1 | 6/2005 | Lundy et al. |
| 6,947,734 | B1 | 9/2005 | Toubassi |
| 6,970,871 | B1 | 11/2005 | Rayburn |
| 2004/0224702 | A1* | 11/2004 | Chaskar ...................... 455/456.3 |
| 2005/0136949 | A1* | 6/2005 | Barnes, Jr. ...................... 455/461 |
| 2005/0228860 | A1* | 10/2005 | Hamynen et al. ............. 709/203 |
| 2006/0242248 | A1* | 10/2006 | Kokkinen ...................... 709/206 |
| 2007/0149210 | A1* | 6/2007 | McKiou et al. ............ 455/456.1 |

OTHER PUBLICATIONS

"The Web Around the Corner: Augmenting the Browser with GPS"—Davide Carboni, Parco Scientifico Polaris, May 2004 http://www.iw3c2.org/WWW2004/docs/2p318.pdf.*

"Cell-ID location technique, limits and benefits: an experimental study"—Emiliano Trevisani and Andrea Vitaletti, IEEE 2004 http://cens.ucla.edu/~mhr/cs219/location/trevisani04.pdf.*

* cited by examiner

*Primary Examiner* — Krista Zele
*Assistant Examiner* — Randy Scott

(57) ABSTRACT

A system, a method and computer-readable for providing the location of client devices to website providers. An application residing on a client device is provided. The application may present content, such as a web page, received over a communications network. The application is configured to generate a request for information describing the location of the client device. In response to this request, a location service may obtain the location of the client device and may communicate this location to a website provider. The website provider may generate a web page for display by the application. This web page may contain content selected based on the location of the client device.

15 Claims, 4 Drawing Sheets

PROVIDING LOCATION INFORMATION TO WEBSITE PROVIDERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Recent growth in wireless telecommunications has ushered in a new era of mobility. The advent of cellular and personal communications services has enabled people to maintain communication from virtually any location. Further, advanced technology has facilitated not only wireless voice communication but also wireless data communication, such as the ability to communicate over computer networks and to access content available over the Internet.

One of the results of this growth has been an increased demand for location-based services. Examples of such services include mapping, navigation (directions) and weather reporting. For instance, given the location of a user, a location-based-service provider can invoke a mapping routine in order to provide the user with a map of the user's geographical area. As another example, given a user's current location and a destination location, a location-based-service provider can invoke a navigation routine in order to provide the user with directions to travel from the current location to the destination location. Further, the location-based-service provider can invoke a weather reporting routine so as to provide the user with a weather report for the destination location.

In some cases, when a user contacts a location-based-service provider from a communication terminal, it is possible for the service provider to determine the user's location by determining the location of the communication terminal. Indeed, an important feature of contemporary cellular wireless networks is an ability to locate the geographical position of a mobile station. In many cases, having the ability to locate the position of a mobile station will lead to providing location-based services to mobile subscribers. For example, location-based services may allow a mobile station's user to inquire about services in their vicinity. Thus, if the user is away from his home area, the user may activate a browser on his mobile station and request consumer information in his vicinity. This information may consist of, but is not limited to, store locations, store hours, and store services. In short, by knowing where a mobile station is located, a service provider may provide a wide range of valuable location based services.

While wireless carriers and content providers have recognized the commercial significance of this new found location information, there are currently inadequate techniques for providing location information to website providers. For example, commercial web pages today require the manual entry of location information. When requesting location-specific content from these web pages, the user may know their location and manually enter it. Even though some existing service providers and products can use/interact with a Global Positioning System (GPS) device, these products are not capable of integrating location information into an online customer experience as the user interacts with a website.

SUMMARY

The present invention provides systems and methods for providing the location of client devices to website providers.

In one aspect of an embodiment of the present invention, an application residing on a client device is provided. The application may present content received over a communications network. The application may generate a request for information describing the location of the client device. In response to this request, a location service may obtain the location of the client device and may communicate this location to a website provider. The website provider may generate a web page for display by the application. This web page may contain content selected based on the location of the client device.

Another aspect of an embodiment of the present invention includes a computerized method for generating web pages based on the location of a client. Communication with a client device is established. The client device provides authorization for its location to be obtained from a location service. Using this location, a web page is generated. The web page may include content selected with reference to the location of the client device.

A further aspect of an embodiment of the present invention includes a computerized method for providing the location of a client device in response to a request for such location information. A service for providing the location of client devices is provided. A request for location information regarding a client device is received. The method determines whether the requestor is authorized to receive the location information. If the requestor is authorized, the requested location information is provided.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWING

The present invention is described in detail below with reference to the attached drawing figures, wherein.

DETAILED DESCRIPTION

Figure 1:
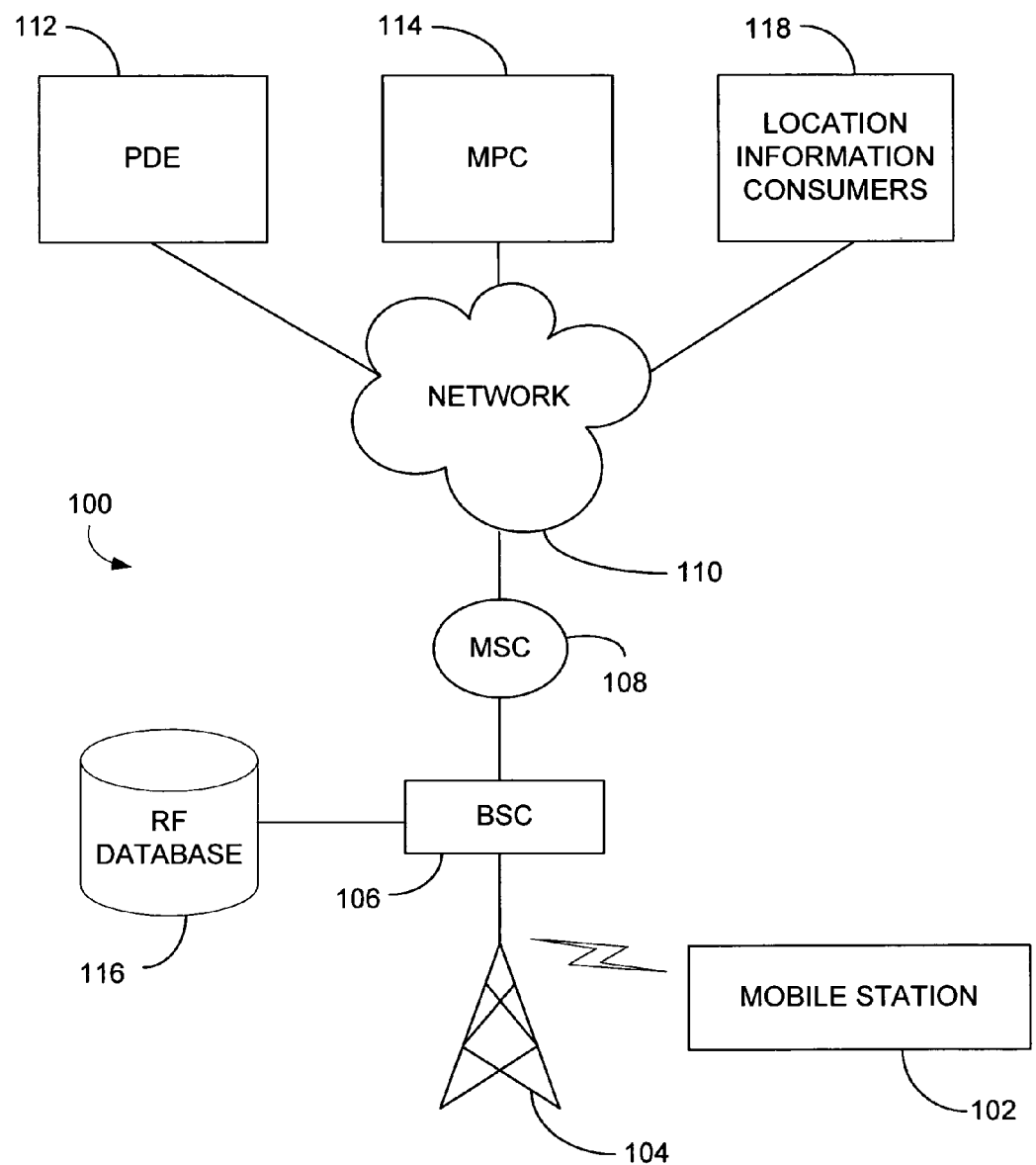
FIG. 1 is a block diagram of a network environment suitable for use in implementing the present invention.

The subject matter of the present invention is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention provides an improved system and method for providing location information to website providers. The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data. Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

The present invention may be embodied as, among other things: a method, system, computer-program product, or combinations thereof. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

The present invention may be practiced in any network environment such as a communications network. Such networks are widely used to connect various types of network elements, such as routers, servers, gateways, network telephones, and so forth. Further, the invention may be practiced in a multi-network environment having various, connected public and/or private networks. The networks may be wireless or wireline ("wired"). As will be appreciated by those skilled in the art, communication networks may take several of different forms and may use several different communication protocols.

FIG. 1 is a simplified block diagram of an exemplary wireless telecommunications network 100 in which exemplary embodiments of the present invention may be employed. It should be understood, of course, that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

The wireless technology used in the network 100 may provide wireless communications to a mobile station 102 located in wireless coverage areas served by the network 100. The wireless telecommunications network 100 includes a base transceiver station (BTS) 104 that provides a wireless coverage area within which the BTS 104 may communicate with one or more mobile stations, such as the mobile station 102, over an air interface. The mobile station 102 may be a wireless telephone, a wirelessly-equipped personal digital assistant (PDA), or other wireless communication device. The communications between the BTS 104 and the mobile station 102 may occur in a digital format, such as CDMA, TDMA, GSM, and/or 802.1x, and/or an analog format, such as AMPS. The BTS 104 may be controlled by a base station controller (BSC) 106. The BSC 106 may be controlled by a mobile switching center (MSC) 108, which is in communication with a network 110. The network 110 may be in communication with a variety of networked devices and may include a public, packet-switched network in communication with the Internet.

The wireless telecommunications network 100 may use a wireless location technology to obtain the location of mobile stations, such as the mobile station 102. The location technology may be mobile-based and/or network-based, and it may use a combination of mobile station and network resources to determine the location of the mobile station 102. For example, the wireless location technology may use a Global Positioning System (GPS) and may be network-assisted. In the network-assisted approach, the mobile station 102 includes a GPS receiver but also communicates with the network 100 to determine its position. A position determining entity (PDE) 112 may then calculate the mobile station's location in terms of geographic coordinates, such as latitude and longitude.

The specific manner in which the network 100 obtains the locations of mobile stations, and the specific network elements that the network 100 uses for location determination, will, in general, depend on the wireless location technology that is used. In an exemplary embodiment, the network 100 may use the PDE 112 and a mobile position center (MPC) 114 in connection with location determinations. For example, the PDE 112 may determine the location (such as in terms of latitude and longitude) of a mobile station, such as the mobile station 102, based at least in part on information provided by mobile station 102 during a location determination session. The MPC 114 may store the locations determined by the PDE 112. The MPC 114 may also control aspects of how the network 100 obtains, uses, and provides location information.

The PDE 112 and the MPC 114 may communicate with other network elements via the network 110 and/or some other type of communication link.

In an exemplary embodiment, wireless assisted GPS is used to determine the location of the mobile station 102. In the wireless assisted GPS approach, the mobile station 102 includes a GPS receiver but does not determine its location on its own. Instead, the PDE 112 determines the location of the mobile station 102 in terms of latitude and longitude, based at least in part on information provided by the mobile station 102. For example, the mobile station 102 may first send an indication of its approximate location, such as the cell, sector, or other wireless coverage area it is operating in, to the PDE 112. Using this approximate location, the PDE 112 determines what GPS satellites are in view and their Doppler offsets. The PDE 112 then sends this information to the mobile station 102 as "assistance data." The mobile station 102 may then use this assistance data to acquire GPS signals from the GPS satellites and, thereby, obtains information from which its location may be calculated. The mobile station 102 sends the location-related information to the PDE 112. The PDE 112 may then calculate the location of the mobile station 102, in terms of latitude and longitude, based on the information from the mobile station 102 and, optionally, various corrections.

The network 100 may, however, use other wireless location technologies for determining the location of mobile stations, such as the mobile station 102. For example, the mobile station 102 may use its GPS receiver to determine its location without network assistance. In this case, the mobile station 102 may simply send to the PDE 112 or other network element its calculated location, e.g., its latitude and longitude, during the location determination session.

Alternatively, the network 100 may use wireless location technologies that do not rely on GPS. For example the network 100 may use Advanced Forward Link Triangulation (AFLT) to locate mobile stations. In the AFLT approach, a mobile station's location is determined (such as by the PDE 112) from the round-trip delays associated with signals between the mobile station and multiple BTSs. In some cases, the network 100 may be able to use more than one type of wireless location technology to determine mobile station location. For example, in some or all of the areas served by the network 100, the network 100 may have the ability to use wireless assisted GPS, AFLT, or both to determine mobile station locations.

The network 100 may also include one or more databases that store parameters specifying aspects of how to carry out location determinations. Such parameters may specify, for example, the power levels, forward link and reverse link calibrations, sector center latitude and longitudes, maximum antenna ranges, antenna latitude and longitudes, and orientation accuracies to use in location determinations. In this regard, FIG. 1 shows a RF database 116 as representative of such databases in the network 100. The RF database 116 may be communicatively coupled to the BSC 106, as shown in FIG. 1. Alternatively, the RF database 116 may be a part of the BSC 106, or the RF database 116 may be a part of, or accessible by, other network elements, such as the PDE 112 and/or the MPC 114.

The wireless telecommunications network 100 may also make the locations of the mobile devices available to location information consumers 118. For example, the MPC 114 may report the location of a mobile station engaged in an E911 call to an element of an emergency services network. Location information consumers 118 may also include other entities, which may be commercial or non-commercial entities. Such location information consumers 118 may, for example, monitor the locations of mobile stations and/or provide location-based services and content (e.g., web pages) to mobile stations or to others.

Figure 2:
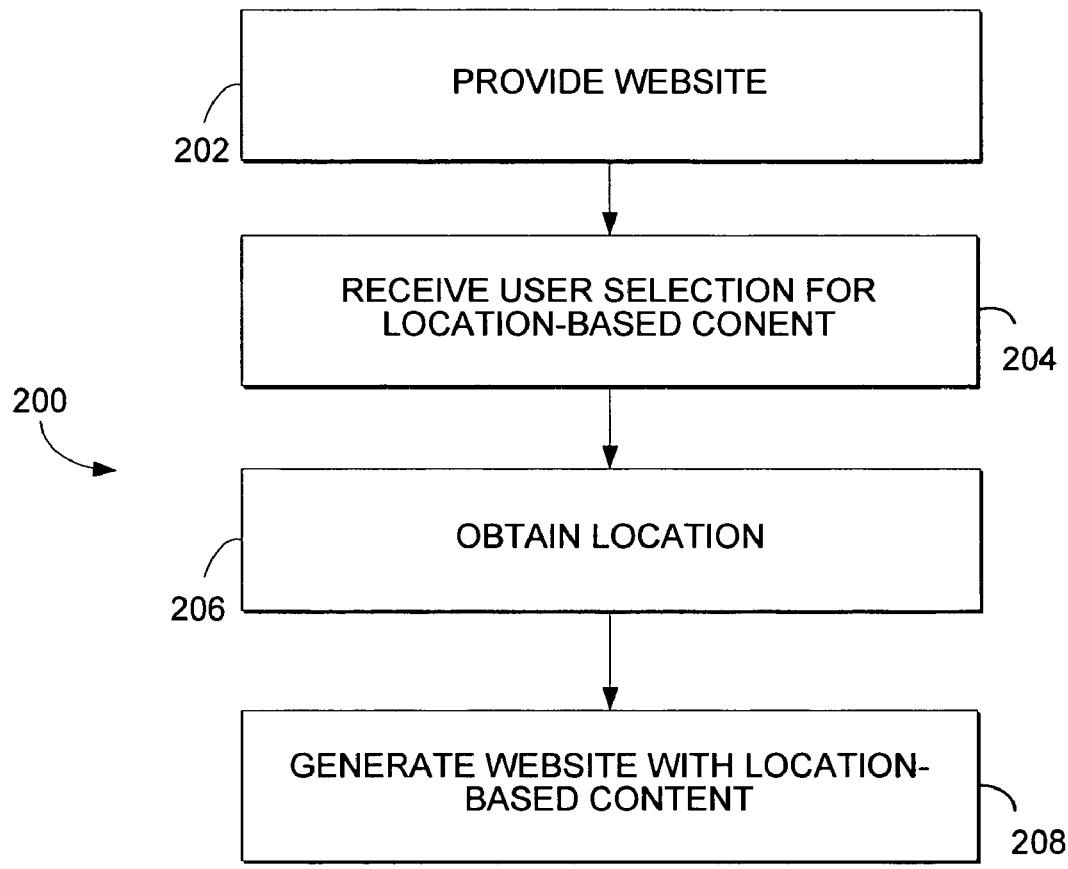
FIG. 2 illustrates a method in accordance with one embodiment of the present invention for generating web pages based on the location of a client device.

FIG. 2 illustrates a method 200 for generating web pages based on the location of a client device. At a step 202, the method 200 provides a web page on a client device. The web page may be provided by any number of client devices configured to receive user inputs and to communicate with a packet-based network. For example, the web page may be presented by a handheld device configured to wirelessly communicate with the network. To access the web page, the user may initiate a browsing application, such as a Wireless Application Protocol (WAP) browser. In this browser, the user may enter the Internet address, i.e., the URL, associated with the web page. As another example, the client device may be a laptop computer executing a web browser. Those skilled in the art will appreciate that the present invention may utilize any number of devices with means to access and present web pages.

At a step 204, the method 200 receives a user input requesting location-based content. In one embodiment, the web page may contain a user-selectable element (e.g. a button or a link). Selection of this element may indicate a user's desire for location-based content. For example, the web page may be provided by a fast-food restaurant chain. To find the location of the closest restaurant in this chain, the user may navigate to the chain's website and select a button offering location-based content, e.g., directions to the nearest restaurant. Alternately, the request for location-based content may be implied from user inputs, such a navigation to a certain web page. In short, there are numerous techniques for the method 200 to detect a user's desire for location-based content.

The method 200, at a step 206, obtains the location of the client device. As previously discussed, there are numerous techniques in the art for finding the location of a client device. Examples of broad categories of location determination technologies that may be used are: network-based solutions; handset-based solutions; and hybrid solutions. Network-based solutions rely on a user's network to determine how far a subscriber is from the network's base stations, thus giving location. Handset solutions for determining locations of client devices may be used with a GPS satellite navigation system. The client device may have a GPS receiver, which may be typically implemented in an integrated circuit in the device. The hybrid approach for determining locations of mobile stations may use GPS receivers in the telecommunications network to determine the location of GPS satellites. The network may transmit this information to the client device, and the client device may take a snapshot of the GPS signal, calculate the distance to the satellites, and send this information back to the server. The server may then calculate the exact location of the mobile station based on the reference signal of the GPS satellites. Still other location determination methods may be used as well, and the present invention is not limited to one type of technology.

Regardless of the location determination method utilized, the method 200 may obtain the location of the client device from any number of different entities and may utilize any number of messaging techniques to request the location information. For example, the location may be obtained directly from the device itself. In this example, a handset-based locator device (e.g., a GPS receiver) may reside on the client device. Alternately, the location may be obtained from a position determining entity in communication with a network, such PDE 112 of FIG. 1. In one embodiment, a PDE maintains a web service configured to receive request for the location of client devices and returns their location.

At a step 208, the method 200 generates a web page with location-based content. Returning to the fast-food restaurant example, the method 200 may generate a web page with directions to the nearest restaurant. Of course, a variety of additional location-specific details may also be included in the web page. As another example, the user may have a flat tire on the roadside. In this example, the user may not know their exact location. To receive assistance, the user may access a website that generates a form automatically populated with the user's current location, and, by using this form, the user may request the necessary roadside assistance. As demonstrated by these examples, the method 200 allows website providers to automatically obtain a user's locations and to integrate such information into an online experience as the user interacts with a website.

Figure 3:
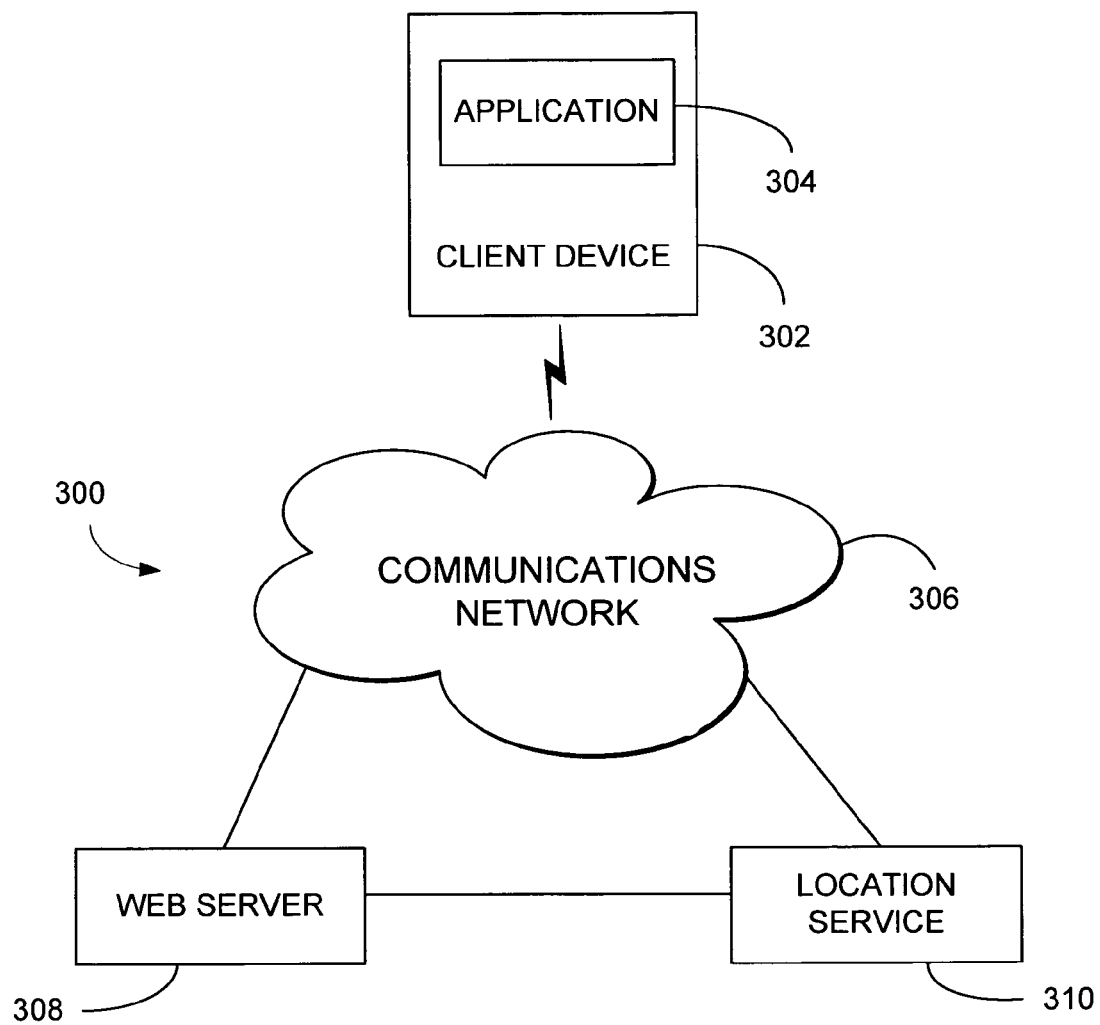
FIG. 3 illustrates a system for providing location information to website providers in accordance with one embodiment of the present invention.

FIG. 3 illustrates a system 300 for providing location information to website providers in accordance with one embodiment of the present invention. The system 300 includes a client device 302. The client device 302 may be any number of devices. For example, the client device 302 may be a computing device in an automobile, a laptop computer or a handheld, mobile communications device. The client device 302 includes an application 304. The application 304 may be configured to present content received over a communications network 306. For example, the application 304 may be a Internet browsing application. The application 304 may enable the client device 302 to establish a connection with the network 306 so as to obtain content via the network 306. The network 306 may enable both wireless and wired communications. In one embodiment, the network 306 may be a packet-switched network that caries communications between networked devices.

The system 300 also includes a web server 308. The web server 308 may be configured to provide web pages for display by the application 304 on the client device 302. For example, a website provided by the web server 308 may include an option for the user to request location-based content. For example, the web page may include a button labeled "Load My Location." Underlying such a button may be executable code or script (e.g., Java Script). Upon user selection of this button, the code may execute on the client device 302. The code, when executed, may allow for various operations to permit the web server 308 to obtain the location of the client device 302.

A location service 310 is included in the system 300. The location service 310 may be similar to the PDE 112 of FIG. 1 and may be configured to provide location information for client devices to entities such as the web server 308. As previously mentioned, there are numerous techniques in the art for determining the location of a client device, and the location service 310 may utilize any number of these techniques. In one embodiment, the aforementioned web page's code, when executed, creates a message that is sent from the client device 302 to the web server 308. This message may contain information enabling the web server 308 to obtain the client device's location from the location service 310. For example, the message may identify the client device 102, as well as the location service 310. The message may also provide authenticating information to indicate that the web server 308 is authorized to receive the location information. In one embodiment, the location service 310 may receive a request for location information from either the client device 302 or the web server 308 and may return such location information to the web server 308 in an automated fashion. In an alternative embodiment not shown on FIG. 3, the location service 310 may reside within the client device 302. In this example, upon user selection to "Load My Location," the location service 310 may be accessed, and it may return the current location of the device 302 to the web server 308.

Once the web server 308 has obtained the location of the client device 302, it may generate a web page containing location-based content. For example, the web page may give a price estimate for the cost of shipping and tax to the user's location. While users today must manually enter their address to receive such estimates, the system 300 enables the calculating of these values in response to a single user click. As another example, the web page may recommend a store. Websites today provide price comparisons between different retailers. By incorporating location information into such comparisons, a web page may recommend a store based not only on price, but also on proximity to the user.

The web server 308 may also use additional information from the user to generate the web pages. For example, a user may upload a picture taken on their camera phone to the web server 308. The web server 308 may present this picture on a web page with the date/time the picture was taken, along with the location of the user at that time. In this manner, the web server 308 may track the location information for a picture. To enable more interactive user implementations, the web pages may include Asynchronous JavaScript and XML (AJAX) or other similar technologies for creating interactive web applications. As will be appreciated by those skilled in the art, the location information provided by the location service 310 to the web server 308 may be used in a variety of different ways, and such information may be leveraged to provide useful information and services.

Figure 4:
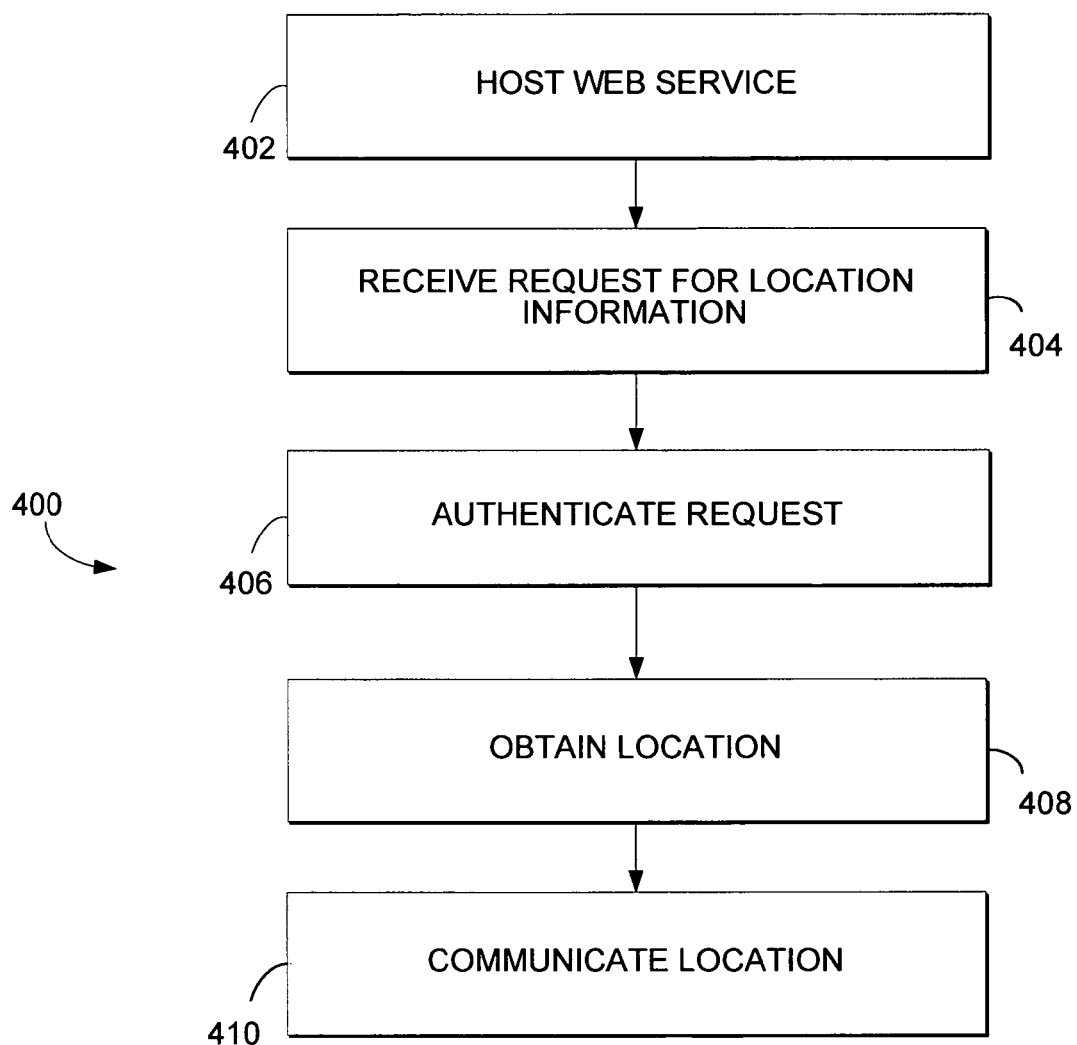
FIG. 4 illustrates a method in accordance with one embodiment of the present invention for providing the location of a client device to a requestor.

FIG. 4 illustrates a method 400 for providing the location of a client device to a requestor. At a step 402, the method 400 hosts a web service for providing location information for a plurality of portable device. As known to those skilled in the art, a web service is a software system designed to support interoperable machine-to-machine interaction over a network. These interactions are typically conveyed using HTTP, and normally comprise XML, in conjunction with other web-related standards. Software applications written in various programming languages and running on various platforms can use web services to exchange data over computer networks, like the Internet, in a manner similar to inter-process communication on a single computer. By providing such a web service, the method 400 may facilitate the providing of location information to requesting entities.

At a step 404, the method 400 receives a request for the location of a portable device. For example, the request may originate from a website provider seeking to provide location-based content to the user of the portable device. The request may be received by the web service and may contain information identifying the requestor and/or the portable device. The request may be structured in accordance with a predetermined format for such requests. Further, the request may include authentication information indicating that the requestor is authorized to receive the location of the portable device. This information may be used by the method 400 at a step 406 to authenticate the request.

If such authentication succeeds, the method 400 obtains the location of the portable device at a step 408. There are numerous techniques in the art for determining the location of a client device, and the method 400 may utilize any number of these techniques. Once the device's location is obtained, the method 400, at a step 410, communicates the location to the requesting entity. For example, the requesting entity may be a website provider and may use the location information to generate a web page with location-based information for display on the portable device. In one embodiment, only a portion of the location information may be communicated at the step 410. For example, to protect user privacy the method 400 may only provide a zip code. In this embodiment, the requestor may still receive enough location information to provide valuable location-based content to the user.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A computer-implemented method for generating web pages based on the location of a client device, said method comprising:
   - establishing communication with a client device of a user over a communications network, wherein said client device includes a web-page browser and a location service;
   - remotely detecting said location service on said client device; incident to said detecting, requesting authorization from said client device to obtain a location for said client device from said location service;
   - transmitting executable code to said client device over said communication network, wherein execution of said executable code enables a web-page provider to interface with said location service on said client device;
   - receiving said location from said client device incident to execution of said executable code; and
   - generating, by said web-page provider, a web page for display on the web-page browser of the client device that includes a user-editable form that is automatically populated with said location of the user and that allows the user to request assistance or service at or by said location of the user.

2. The method of claim 1, wherein said client device is at least one of a mobile telecommunication device or a computer laptop.

3. The method of claim 1, wherein said client device includes a Global Positioning System (GPS) receiver.

4. The method of claim 3, wherein said location service utilizes information from said GPS receiver to obtain said location.

5. The method of claim 1, further comprising presenting on the client device a user-selectable link, wherein user selection of said link indicates user consent to said authorization.

6. The method of claim 1, wherein said authorization contains information for use in obtaining said location from said location service.

7. The method of claim 1, wherein said location service utilizes information from a wireless network provider to obtain said location.

8. One or more computer-readable media having computer-useable instructions embodied thereon to perform the method of claim 1.

9. The method of claim 1, wherein said location service resides at least in part on said client device.

10. The method of claim 1, wherein said web-page browser is a Wireless Application Protocol (WAP) browser.

11. The method of claim 1, wherein said executable code is script.

12. The method of claim 11, wherein said script is Java Script.

13. The method of claim 1, wherein said communication of the location of said client device to said web-page provider is by indirect communication via a plurality of devices on said communications network.

14. The method of claim 13, wherein said plurality of devices includes said client device.

15. The method of claim 1, wherein said form includes a request for roadside assistance at said location.

* * * * *